US012713313B2

(12) United States Patent
Damnjanovic et al.

(10) Patent No.: US 12,713,313 B2
(45) Date of Patent: Aug. 18, 2026

(54) CANDIDATE CELL CONFIGURATION PROCESSING FOR LOWER LAYER TRIGGERED MOBILITY

(71) Applicant: QUALCOMM Incorporated, San Diego, CA (US)

(72) Inventors: Jelena Damnjanovic, Del Mar, CA (US); Tao Luo, San Diego, CA (US); Naeem Akl, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 18/500,759

(22) Filed: Nov. 2, 2023

(65) Prior Publication Data

US 2024/0155449 A1 May 9, 2024

Related U.S. Application Data

(60) Provisional application No. 63/382,388, filed on Nov. 4, 2022.

(51) Int. Cl.
*H04W 36/00* (2009.01)
*H04W 36/36* (2009.01)

(52) U.S. Cl.
CPC ... *H04W 36/008355* (2023.05); *H04W 36/36* (2013.01)

(58) Field of Classification Search
None
See application file for complete search history.

(56) References Cited

U.S. PATENT DOCUMENTS

2021/0385708 A1 12/2021 Damnjanovic et al.
2022/0322177 A1 10/2022 Damnjanovic et al.
2025/0203467 A1* 6/2025 Gundogan .......... H04W 36/085
2025/0365594 A1* 11/2025 Da Silva ............... H04W 24/10

FOREIGN PATENT DOCUMENTS

WO 2022123537 A1 6/2022
WO 2022205034 A1 10/2022
WO WO-2024097978 A1 * 5/2024 ............ H04W 36/08

OTHER PUBLICATIONS

MediaTek Inc., L1/L2-based Mobility Enhancements in Rel-18, 3GPP TSG RAN (Year: 2021).*
International Search Report and Written Opinion—PCT/US2023/078614—ISA/EPO—Feb. 27, 2024.
Qualcomm Incorporated: "L1/L2 Mobility-General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, Aug. 8, 2022, 6 Pages, XP052260662, paragraphs [0105]-[0111], figure 7.

* cited by examiner

*Primary Examiner* — Luna Weissberger
(74) *Attorney, Agent, or Firm* — Harrity & Harrity, LLP

(57) ABSTRACT

Various aspects of the present disclosure generally relate to wireless communication. In some aspects, a user equipment (UE) may receive, for each of one or more candidate cells, a lower layer triggered mobility configuration. The UE may identify a subset of candidate cells, of the one or more candidate cells, for which a lower layer triggered mobility configuration is to be processed based at least in part on reception of the lower layer triggered mobility configuration. The UE may process, for each of the subset of candidate cells, a corresponding lower layer triggered (Continued)

mobility configuration. Numerous other aspects are described.

30 Claims, 11 Drawing Sheets

600
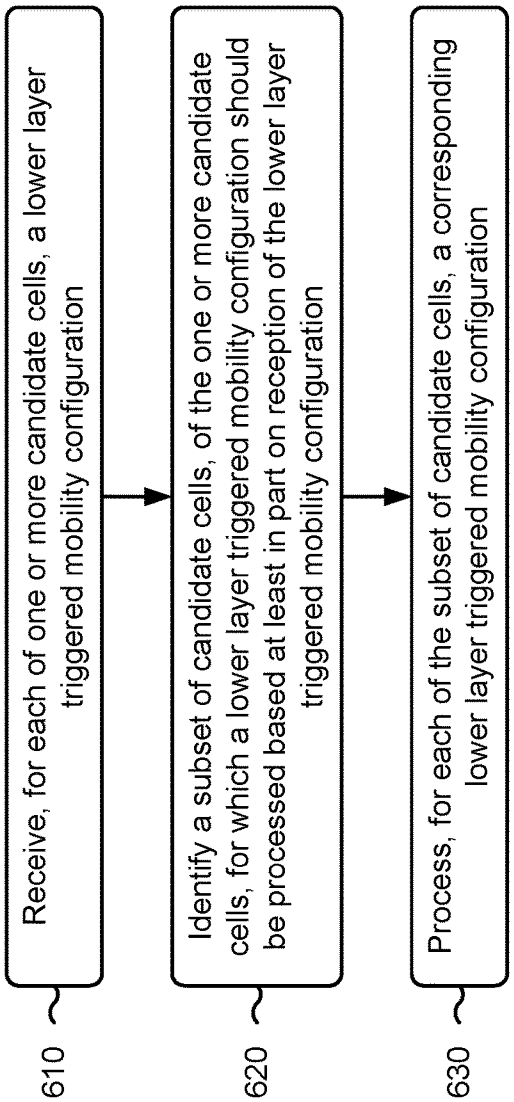
FIG. 6

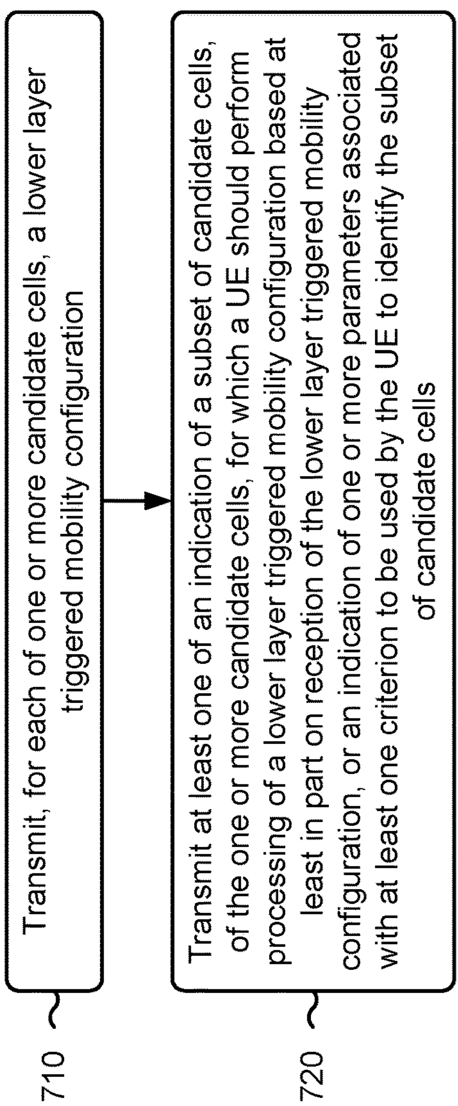
700
710
Transmit, for each of one or more candidate cells, a lower layer triggered mobility configuration
720
Transmit at least one of an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells

FIG. 7

CANDIDATE CELL CONFIGURATION PROCESSING FOR LOWER LAYER TRIGGERED MOBILITY

CROSS-REFERENCE TO RELATED APPLICATION

This patent application claims priority to U.S. Provisional Patent Application No. 63/382,388, filed on Nov. 4, 2022, entitled "CANDIDATE CELL CONFIGURATION PROCESSING FOR LOWER LAYER TRIGGERED MOBILITY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for candidate cell configuration processing for lower layer triggered mobility.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, for each of one or more candidate cells, a lower layer triggered mobility configuration. The method may include identifying a subset of candidate cells, of the one or more candidate cells, for which a lower layer triggered mobility configuration is to be processed based at least in part on reception of the lower layer triggered mobility configuration. The method may include processing, for each of the subset of candidate cells, a corresponding lower layer triggered mobility configuration.

Some aspects described herein relate to a method of wireless communication performed by a network node. The method may include transmitting, for each of one or more candidate cells, a lower layer triggered mobility configuration. The method may include transmitting at least one of an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

Some aspects described herein relate to a UE for wireless communication. The UE may include one or more memories, one or more processors coupled to the one or more memories, and instructions stored in the one or more memories. The instructions may be executable by the one or more processors to cause the UE to receive, for each of one or more candidate cells, a lower layer triggered mobility configuration. The instructions may be executable by the one or more processors to cause the UE to identify a subset of candidate cells, of the one or more candidate cells, for which a lower layer triggered mobility configuration is to be processed based at least in part on reception of the lower layer triggered mobility configuration. The instructions may be executable by the one or more processors to cause the UE to process, for each of the subset of candidate cells, a corresponding lower layer triggered mobility configuration.

Some aspects described herein relate to a network node for wireless communication. The network node may include one or more memories, one or more processors coupled to the one or more memories, and instructions stored in the one or more memories. The instructions may be executable by the one or more processors to cause the network node to transmit, for each of one or more candidate cells, a lower layer triggered mobility configuration. The instructions may be executable by the one or more processors to cause the network node to transmit at least one of an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

Some aspects described herein relate to a non-transitory computer-readable medium that stores a set of instructions for wireless communication by a UE. The set of instructions, when executed by one or more processors of the UE, may cause the UE to receive, for each of one or more candidate cells, a lower layer triggered mobility configuration. The set of instructions, when executed by one or more processors of the UE, may cause the UE to identify a subset of candidate cells, of the one or more candidate cells, for which a lower layer triggered mobility configuration is to be processed based at least in part on reception of the lower layer triggered mobility configuration. The set of instructions, when executed by one or more processors of the UE, may cause the UE to process, for each of the subset of candidate cells, a corresponding lower layer triggered mobility configuration.

Some aspects described herein relate to a non-transitory computer-readable medium that stores a set of instructions for wireless communication by a network node. The set of instructions, when executed by one or more processors of the network node, may cause the network node to transmit, for each of one or more candidate cells, a lower layer triggered mobility configuration. The set of instructions, when executed by one or more processors of the network node, may cause the network node to transmit at least one of an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

Some aspects described herein relate to an apparatus for wireless communication. The apparatus may include means for receiving, for each of one or more candidate cells, a lower layer triggered mobility configuration. The apparatus may include means for identifying a subset of candidate cells, of the one or more candidate cells, for which a lower layer triggered mobility configuration is to be processed based at least in part on reception of the lower layer triggered mobility configuration. The apparatus may include means for processing, for each of the subset of candidate cells, a corresponding lower layer triggered mobility configuration.

Some aspects described herein relate to an apparatus for wireless communication. The apparatus may include means for transmitting, for each of one or more candidate cells, a lower layer triggered mobility configuration. The apparatus may include means for transmitting at least one of, an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with the present disclosure.

FIG. 7 is a diagram illustrating an example process performed, for example, by a network node, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
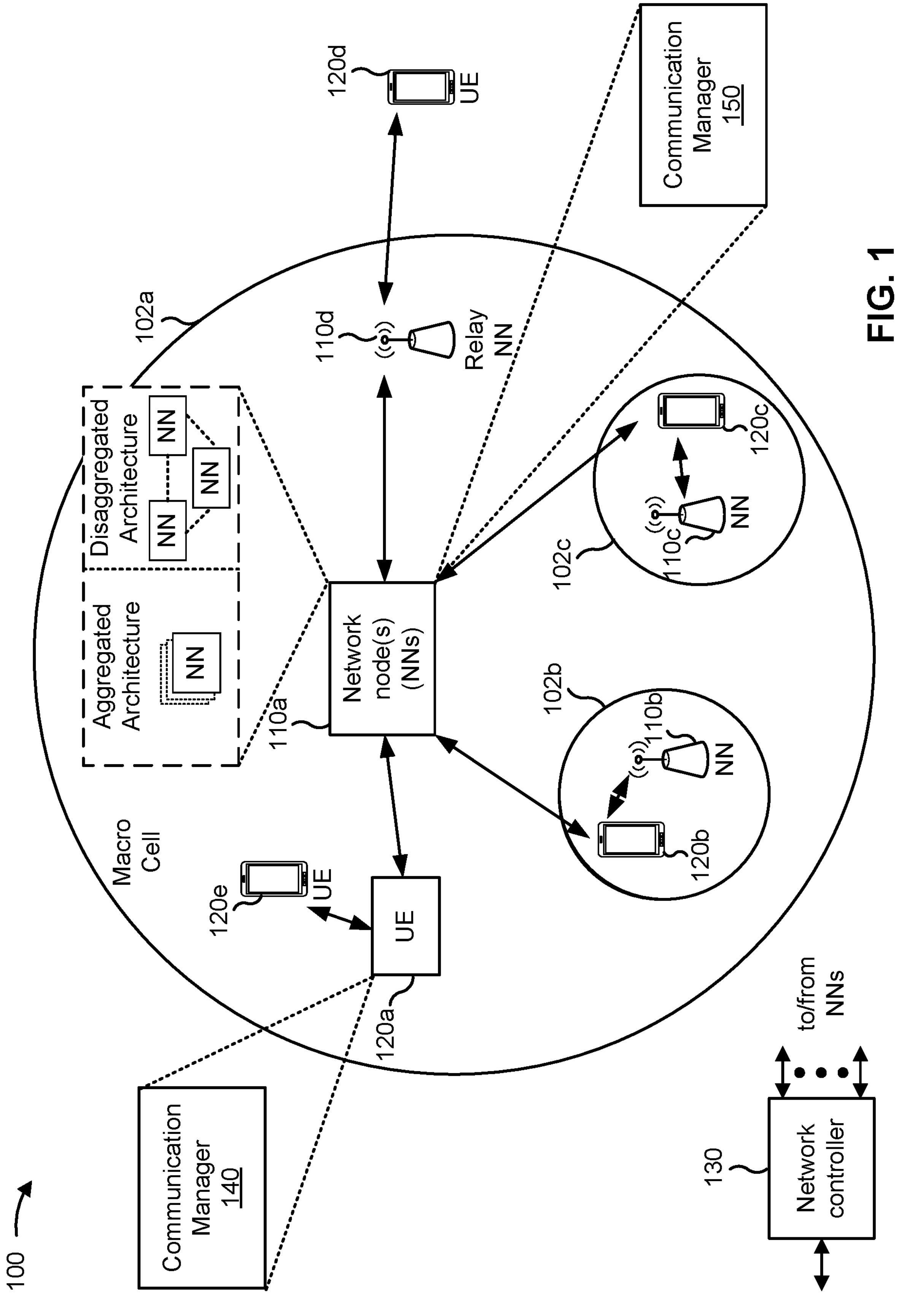
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*e*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node **110*d* (e.g., a relay network node) may communicate with the network node 110*a* (e.g., a macro network node) and the UE 120*d* in order to facilitate communication between the network node 110*a* and the UE 120*d*. A network node 110** that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE **120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110**.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit 1-R1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, for each of one or more candidate cells, a lower layer triggered mobility configuration; identify a subset of candidate cells, of the one or more candidate cells, for which a lower layer triggered mobility configuration is to be processed based at least in part on reception of the lower layer triggered mobility configuration; and process, for each of the subset of candidate cells, a corresponding lower layer triggered mobility configuration. Additionally, or alternatively, the communication manager 140 may perform one or more other operations described herein.

In some aspects, the network node 110 may include a communication manager 150. As described in more detail elsewhere herein, the communication manager 150 may transmit, for each of one or more candidate cells, a lower layer triggered mobility configuration; and transmit at least one of: an indication of a subset of candidate cells, of the one or more candidate cells, for which a UE 120 should perform processing of a lower layer triggered mobility configuration based at least in part on reception of the lower layer triggered mobility configuration, or an indication of one or more parameters associated with at least one criterion to be used by the UE 120 to identify the subset of candidate cells. Additionally, or alternatively, the communication manager 150 may perform one or more other operations described herein.

As indicated above, FIG. 1 is provided as an example. Other examples may differ from what is described with regard to FIG. 1.

Figure 2:
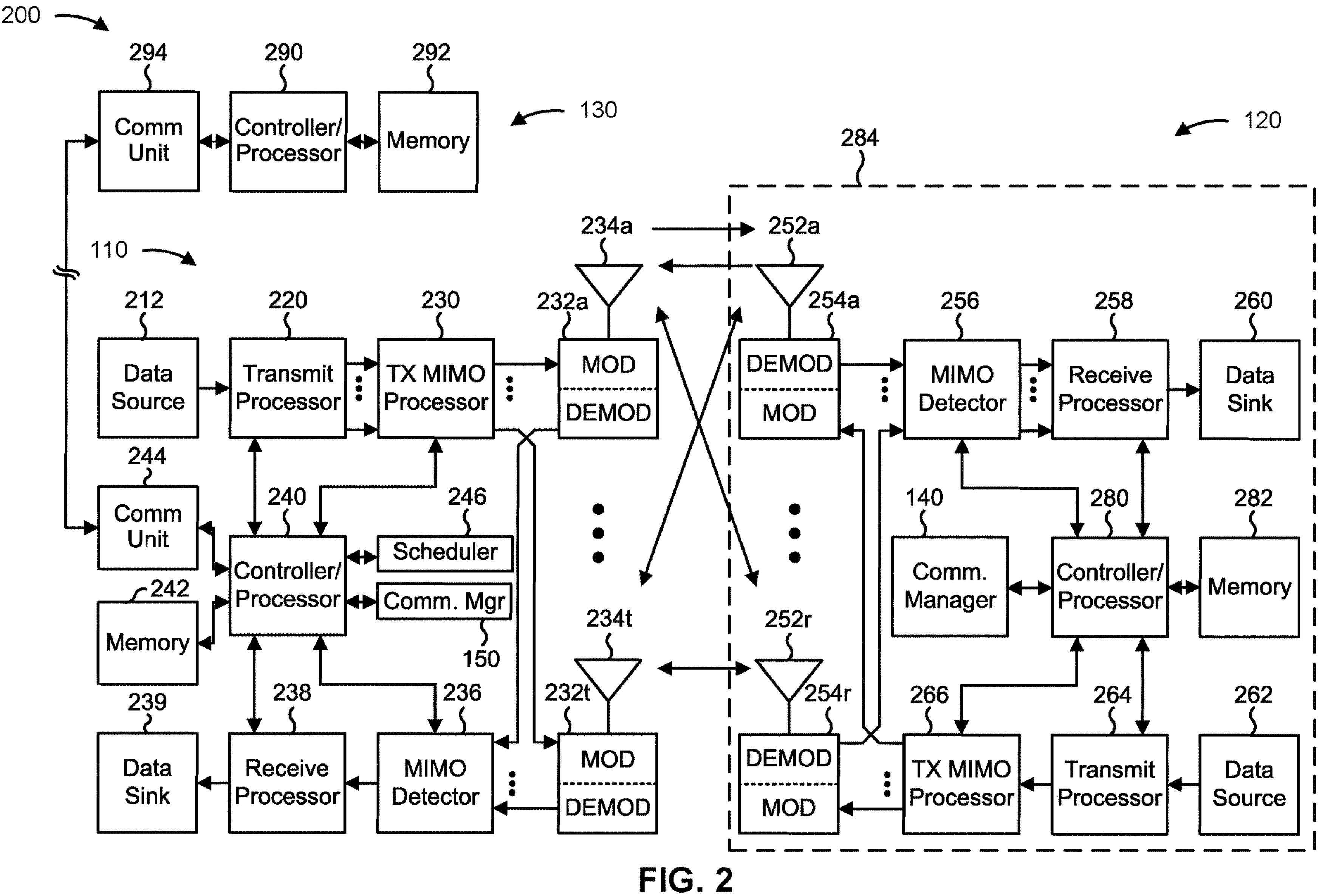
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-9).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-9).

The controller/processor 240 of the network node 110, the controller/processor 280 of the UE 120, and/or any other component(s) of FIG. 2 may perform one or more techniques associated with candidate cell configuration processing for lower layer triggered mobility, as described in more detail elsewhere herein. For example, the controller/processor 240 of the network node 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE 120 includes means for receiving, for each of one or more candidate cells, a lower layer triggered mobility configuration; means for identifying a subset of candidate cells, of the one or more candidate cells, for which a lower layer triggered mobility configuration is to be processed based at least in part on reception of the lower layer triggered mobility configuration; and/or means for processing, for each of the subset of candidate cells, a corresponding lower layer triggered mobility configuration. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, for each of one or more candidate cells, a lower layer triggered mobility configuration; and/or means for transmitting at least one of: an indication of a subset of candidate cells, of the one or more candidate cells, for which a UE 120 should perform processing of a lower layer triggered mobility configuration based at least in part on reception of the lower layer triggered mobility configuration, or an indication of one or more parameters associated with at least one criterion to be used by the UE 120 to identify the subset of candidate cells. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
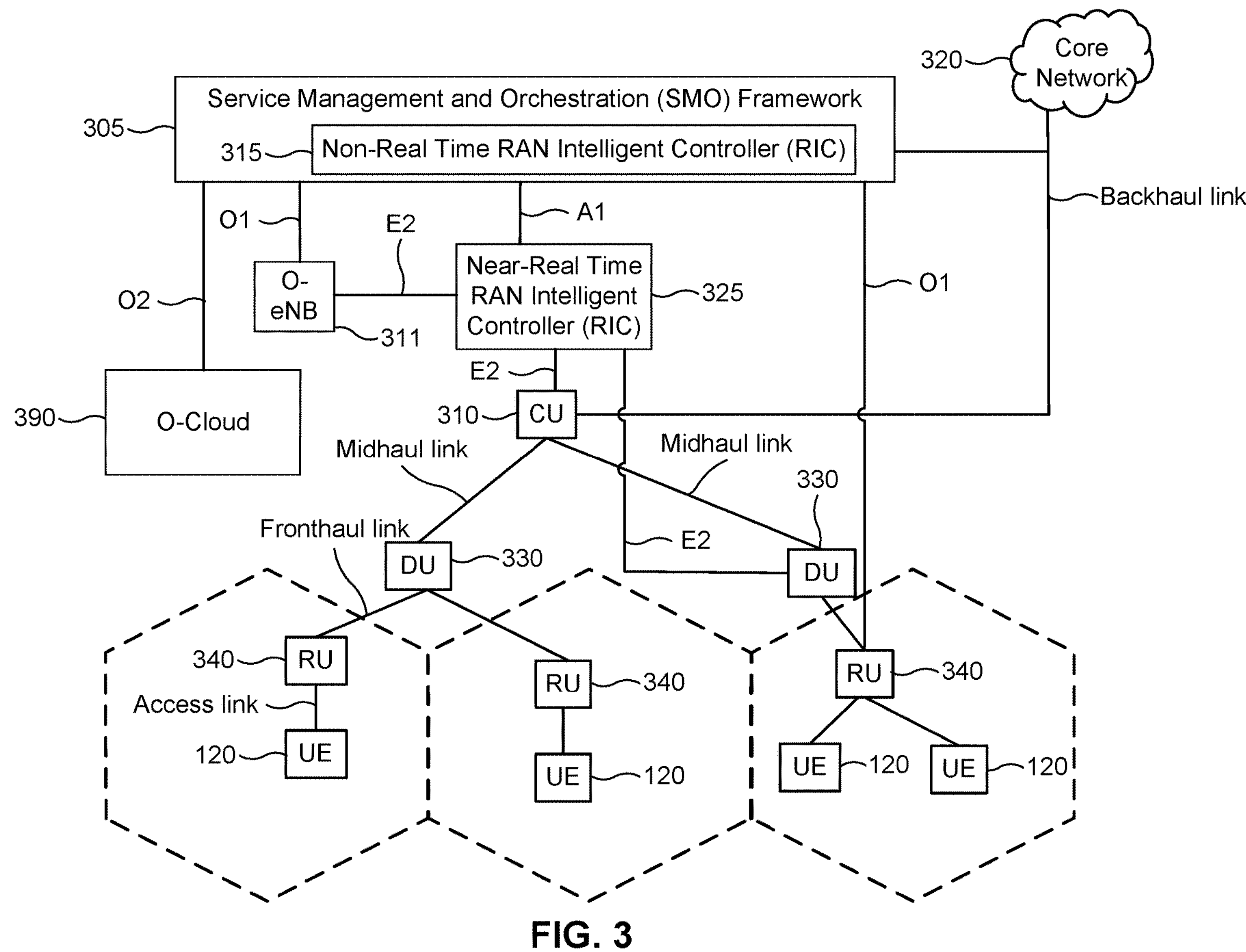
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
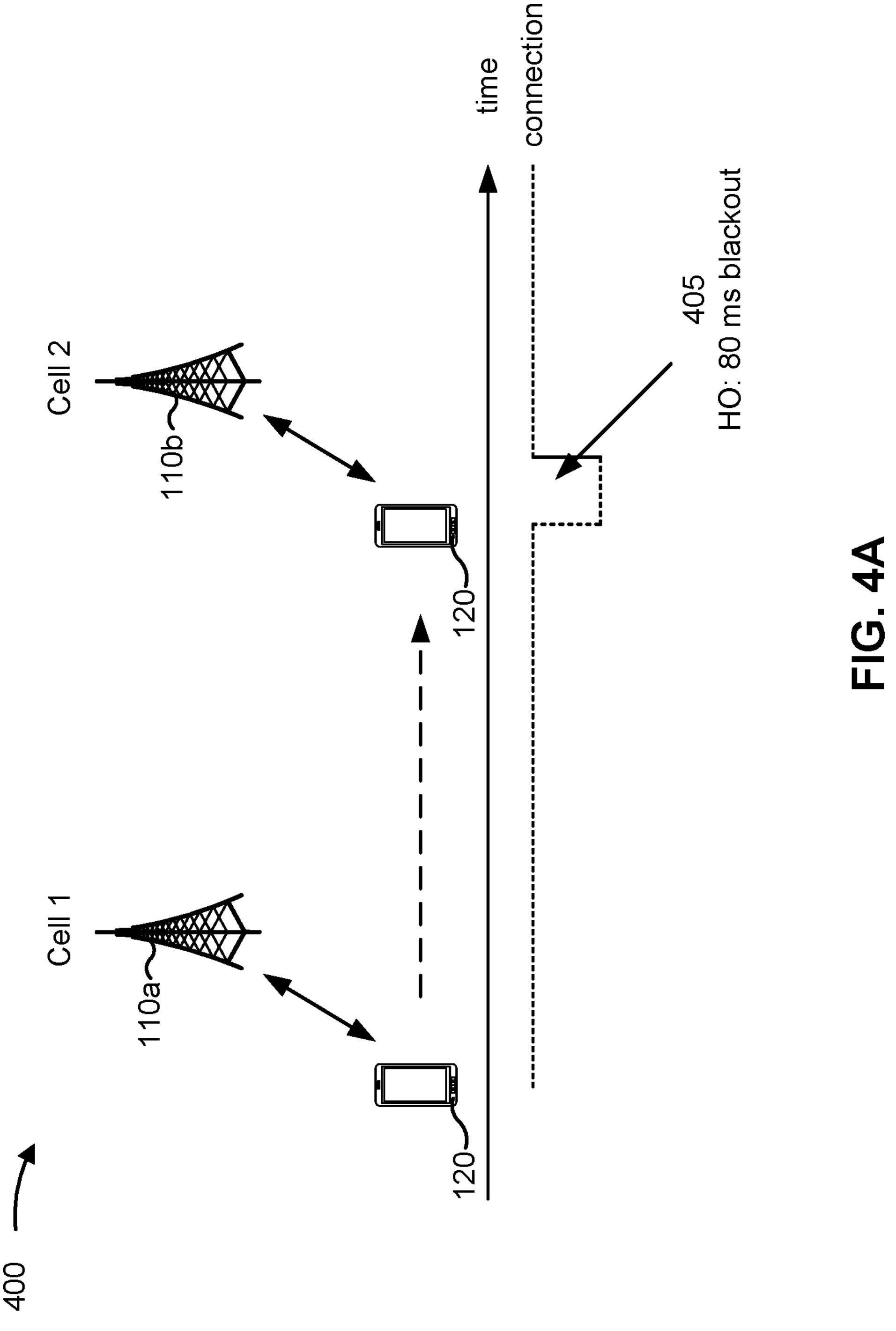
FIGS. 4A-4C are diagrams illustrating example cell mobility procedures, in accordance with the present disclosure.
Figure 4B:
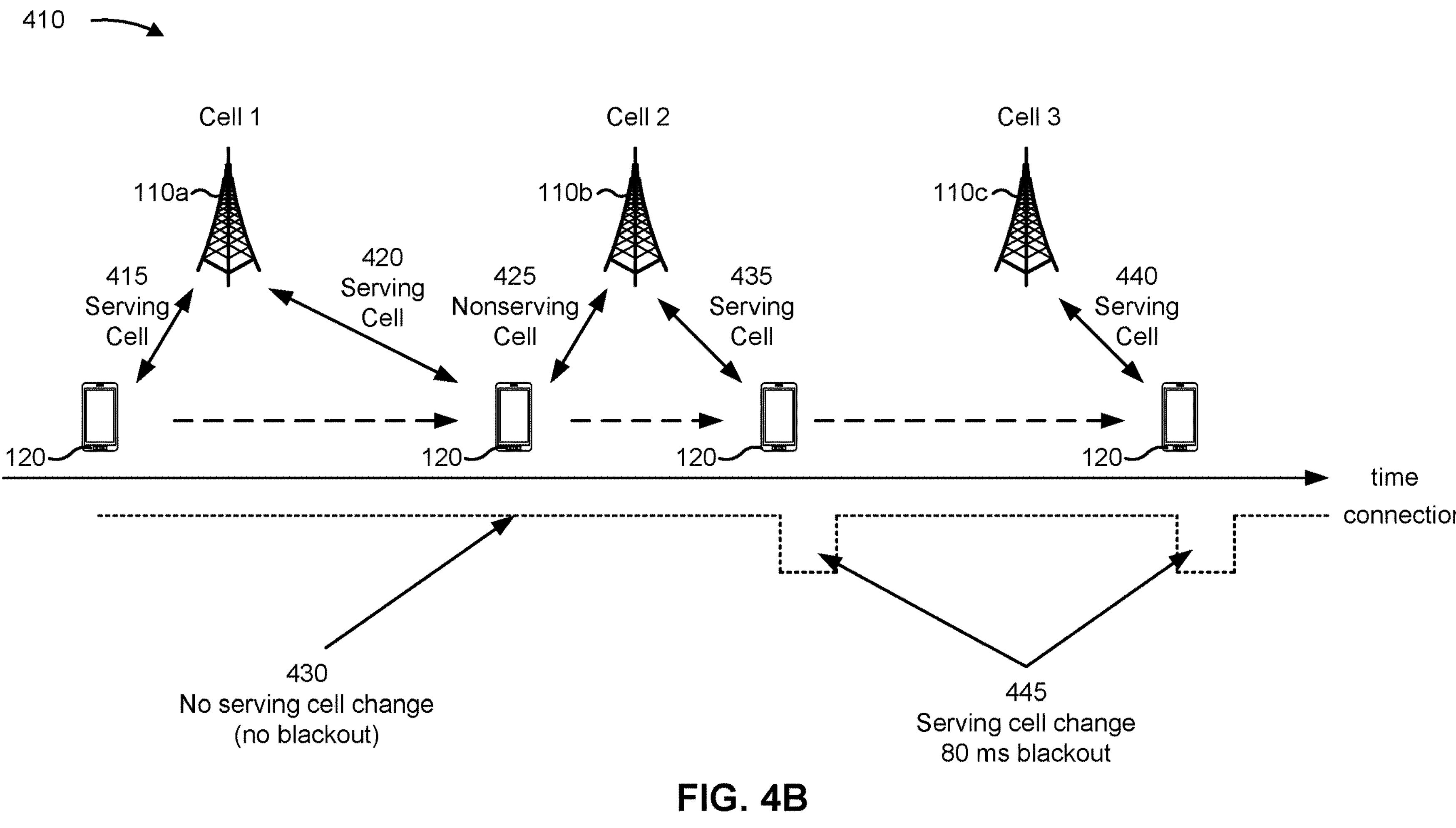
Figure 4C:
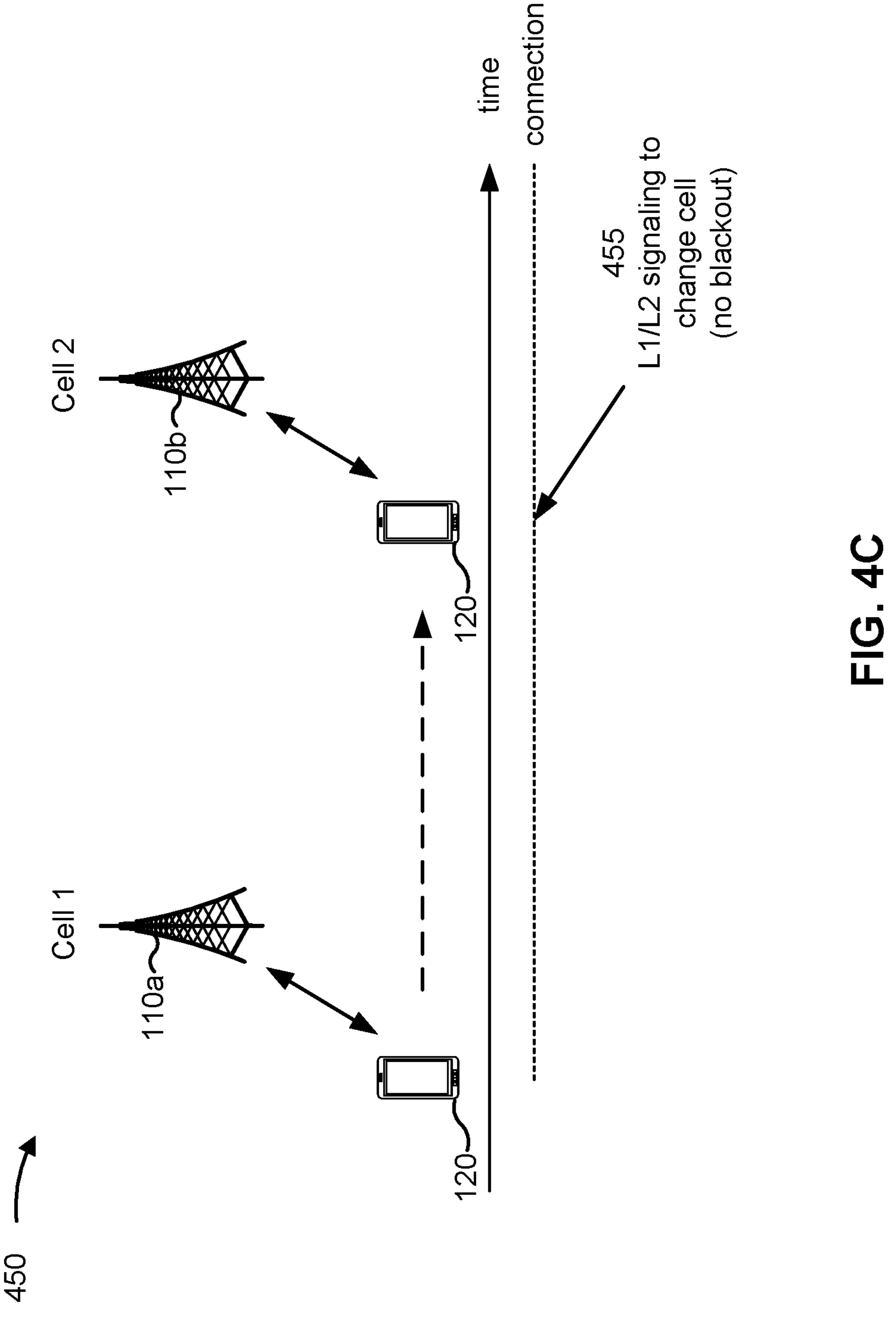

FIGS. 4A-4C are diagrams illustrating example cell mobility procedures, in accordance with the present disclosure.

FIG. 4A illustrates an example 400 of a Layer 3 (L3) mobility procedure, sometimes referred to as an L3 handover procedure. In some aspects, the example 400 L3 mobility procedure may be associated with Release 15 and/or Release 16 of a 3GPP wireless communication standard. In the example 400 L3 mobility procedure, a serving cell of a UE 120 may be changed using L3 configurations and/or signaling. More particularly, the UE 120 shown in FIG. 4A may change a serving cell (sometimes referred to as a special cell (SpCell)) between a first cell (e.g., Cell 1) associated with a first network node 110*a* and a second cell (e.g., Cell 2) associated with a second network node 110*b*, such as when the UE 120 moves away from a coverage area provided by the first cell.

In such examples, the first network node 110*a* and/or the second network node 110*b* may utilize L3 configurations and/or signaling to perform the handover from the first cell to the second cell. For example, handover may be performed when the second cell becomes a stronger cell than the first cell and/or when the second cell becomes a better candidate to serve as the serving cell (e.g., SpCell) for the UE 120. In some examples, the UE 120 may perform certain measurements associated with the first cell (sometimes referred to as the serving cell) and/or the second cell (sometimes referred to as the target cell), and may report the measurements to the first network node 110*a* via a measurement report. The measurement report may indicate certain measurements associated with the first cell and/or the second cell, such as an RSRP measurement, an RSRQ measurement, an RSSI measurement, and/or a signal-to-interference-plus-noise ratio (SINR) measurement. The first network node 110*a* may use the measurement report to determine whether to trigger a handover of the UE 120 to the second network node 110*b*. For example, if one or more measurements satisfy a condition, then the first network node 110*a* may trigger a handover of the UE 120 to the second network node 110*b*.

In some examples, the first network node 110*a* and the second network node 110*b* may communicate with one another to prepare for a handover of the UE 120. As part of the handover preparation, the first network node 110*a* may transmit a handover request to the second network node 110*b* to instruct the second network node 110*b* to prepare for the handover. The first network node 110*a* may communicate RRC context information associated with the UE 120 and/or configuration information associated with the UE 120 to the second network node 110*b*. The second network node 110*b* may prepare for the handover by reserving resources for the UE 120. After reserving the resources, the second network node 110*b* may transmit an acknowledgement (ACK) to the first network node 110*a* in response to the handover request.

The first network node 110*a* may then use L3 signaling in order to trigger handover to the second network node 110*b*. More particularly, the first network node 110*a* may transmit an RRC reconfiguration message to the UE 120. The RRC reconfiguration message may include a handover command (sometimes referred to as a cell switch command) instructing the UE 120 to execute a handover procedure from the first network node 110*a* to the second network node 110*b*. The handover command may include information associated with the second network node 110*b*, such as a random access channel (RACH) preamble assignment for accessing the second network node 110*b*.

Upon reception of the RRC reconfiguration message, including the handover command, the UE 120 may execute the handover by performing a random access procedure with the second network node 110*b* (e.g., including synchronization with the second network node 110*b*). Upon successfully establishing a connection with the second network node 110*b* (e.g., via a random access procedure), the UE 120 may transmit an RRC reconfiguration completion message to the first network node 110*a*, which may trigger a release of a connection between the first network node 110*a* and the UE 120.

The example 400 L3 mobility procedure shown in FIG. 4A may be relatively slow and/or may be associated with periods of interrupted communications between the UE 120 and the network. For example, candidate cell evaluation by the UE 120 and/or the first network node 110*a* may be relatively slow, on the order of approximately one second. Moreover, as shown by reference number 405, there may be a blackout period associated with a handover. For example, when executing handover from the first cell to the second cell, the UE 120 may experience an 80 millisecond (ms) blackout period, during which no data may be communicated between the UE 120 and the network.

In some examples, Layer 1 (L1) and/or Layer 2 (L2) signaling may be utilized during a handover procedure in order to reduce latency associated with the handover procedure, reduce or eliminate blackout periods associated with the handover procedure, or otherwise reduce communication interruptions between the UE 120 and the network. For example, FIG. 4B shows an example 410 of an inter-cell beam management procedure that may reduce latency and/or interrupted communications associated with a handover procedure. In some aspects, the example 410 inter-cell beam management procedure may be associated with Release 17 of a 3GPP wireless communication standard. In the example inter-cell beam management procedure, the UE 120 may be connected to a serving cell for purposes of receiving control and data communications, and potentially to one or more additional cells (sometimes referred to as non-serving cells) for purposes of receiving data. In such examples, non-serving cells may be changed using L1/L2 signaling, eliminating the blackout period associated with an L3 handover, such as the blackout period described above in connection with reference number 405.

More particularly, as shown in FIG. 4B, and as indicated by reference number 415, the UE 120 may be connected to a first network node 110*a* associated with a first cell (e.g., Cell 1), which may be the serving cell of the UE 120. As the UE 120 moves into coverage of other cells, the UE 120 may connect to one or more additional cells. More particularly, as shown by reference numbers 420 and 425, as the UE 120 moves farther away from the first cell (e.g., Cell 1) and closer to a second cell (e.g., Cell 2, associated with a second network node 110*b*), the UE 120 may maintain the first cell as the serving cell (as indicated by reference number 420), but may establish a connection with the second cell to serve as a nonserving cell (as indicated by reference number 425). Because the nonserving cell may be changed using L1/L2 signaling, the 80 ms blackout time associated with an L3 handover may be eliminated, as indicated by reference number 430.

However, in examples in which the UE 120 switches serving cells, the UE 120 may need to perform an L3 handover procedure and thus may experience the 80 ms blackout period described above in connection with reference number 405. For example, if a measurement associated with a current serving cell (e.g., RSRP) is greater than a first threshold and/or if a difference between a measurement associated with a candidate cell and a corresponding measurement associated with the current serving cell is less than a second threshold, the UE 120 may not switch serving cells. However, once the measurement associated with the current serving cell (e.g., RSRP) falls below the first threshold and/or once the difference between the measurement associated with the candidate cell and the corresponding measurement associated with the current serving cell is greater than the second threshold, an L3 handover procedure may be triggered to replace the current serving cell with the candidate cell. For example, as the UE 120 continues to move farther from the first network node 110*a* and thus closer to the second network node 110*b* and then a third network node 110*c*, the UE 120 may switch serving cells (e.g., may perform an L3 handover procedure) from the first cell (e.g., Cell 1) associated with the first network node 110*a* to a second cell (e.g., Cell 2) associated with the second network node 110*b* (as indicated by reference number 435) and then to a third cell (e.g., Cell 3) associated with the third network node 110*c* (as indicated by reference number 440). In this regard, and as indicated by reference number 445, the UE 120 may experience an 80 ms blackout period for each serving cell change.

In some examples, in order to reduce or eliminate coverage interruptions associated with switching serving cells, a UE 120's serving cell may be changed using L1 signaling (e.g., using downlink control information (DCI) signaling) and/or L2 signaling (e.g., using MAC control element (MAC-CE) signaling), which may reduce or eliminate the 80 ms blackout period associated with the L3 handover procedures described above in connection with FIGS. 4A-4B. For example, FIG. 4C shows an example 450 of an L1/L2 mobility procedure (sometimes referred to as a lower layer triggered mobility (LTM) procedure), which may reduce or eliminate connection blackout periods, such as the 80 ms blackout periods described above in connection with reference numbers 405 and 445. In some aspects, the example 450 L1/L2 mobility procedure (e.g., LTM procedure) may be associated with Release 18 of a 3GPP wireless communication standard. As used herein "lower layer" refers to a layer below L3 (e.g., a layer below an RRC layer), and thus includes L1 and L2.

In the L1/L2 mobility procedure shown in FIG. 4C, a serving cell associated with the UE 120 may be changed from a first cell (e.g., Cell 1) associated with a first network node 110*a* to a second cell (e.g., Cell 2) associated with a second network node 110*b* using L1 signaling (e.g., DCI signaling) and/or L2 signaling (e.g., MAC-CE signaling), with no L3 handover involved. As indicated by the uninterrupted connection line shown by reference number 455, using L1 and/or L2 signaling to switch between serving cells (e.g., using L1 and/or L2 signaling to transmit and receive a cell switch command) may result in an uninterrupted connection at the UE 120 by eliminating the 80 ms blackout period or similar interrupted service. In such examples, the UE 120 may receive an L1/L2 mobility configuration (sometimes referred to as a lower layer triggered mobility configuration and/or an LTM configuration) for one or more candidate cells via an RRC message prior to the L1/L2 switch being triggered. For example, the UE 120 may receive, from the first network node 110*a*, an L1/L2 mobility configuration associated with the second cell (e.g., Cell 2) and/or the second network node 110*b* prior to the L1/L2 switch being triggered. The UE 120 may thus prepare for the switch in serving cells (such as by decoding and validating the L1/L2 mobility configuration associated with the second cell and/or the network node 110*b*) prior to switching serving cells. In this regard, when a serving cell switch is triggered (e.g., via a DCI communication and/or a MAC-CE communication), the UE 120 may switch serving cells with an uninterrupted connection because, as indicated by reference number 455, no RRC messages and/or configuration information need to be signaled in order to implement the serving cell change.

In some examples, the UE 120 may store any received lower layer triggered mobility configurations of candidate cells and then process a corresponding configuration once a candidate cell is indicated by an L1/L2 cell switch command (sometimes referred to as an LTM cell switch command) More particularly, a network node 110 (e.g., the first network node 110*a*) may transmit, to the UE 120, one or more RRC configurations of one or more candidate cells (e.g., one or more neighboring cells that are candidates to become a serving cell of the UE 120). The UE 120 may store the RRC configurations but not yet process the RRC configurations. Instead, the UE 120 may only be required to process an RRC configuration (e.g., perform a decoding procedure, such as an abstract syntax notation one (ASN.1) decoding procedure, associated with the RRC configuration and/or a validation procedure associated with the RRC configuration) if a corresponding candidate cell is indicated by an L1/L2 cell switch command Put another way, the UE 120 may only process an RRC configuration for a candidate cell when the candidate cell has been selected to replace a current serving cell. In such examples, the UE 120 may transmit two responses to the network node 110. First, the UE 120 may transmit an acknowledgement of reception of the RRC configurations of the one or more candidate cells. Second, the UE 120 may transmit a confirmation of a successful application of the configuration of a selected target cell, such as in response to reception of an L1/L2 cell switch command, which may indicate successful access to the target cell.

In some other examples, the UE 120 may perform processing of all received lower layer triggered mobility configurations upon reception of the configurations. More particularly, a network node 110 (e.g., the first network node 110*a*) may transmit, to the UE 120, one or more RRC configurations of one or more candidate cells. Upon reception, the UE 120 may process the RRC configurations, such as by performing a decoding procedure (e.g., an ASN.1 decoding procedure) and/or a validation procedure. The UE 120 may thereafter adopt a configuration of a target cell during a serving cell switch (e.g., in response to receiving an L1/L2 cell switch command) In such examples, the UE 120 may transmit a single response to the network node 110 upon validation of the one or more RRC configurations of the one or more candidate cells. In some examples, successful access to the target cell may further be indicated by the UE 120, and the indication may be explicit or implicit (e.g., by the UE 120 not transmitting a cell switch failure indication or similar indication within a certain time period of receiving the L1/L2 cell switch command).

For L1/L2 mobility procedures in which the UE 120 stores any received lower layer triggered mobility configurations of candidate cells and only performs processing of a configuration if a corresponding candidate cell is indicated by an L1/L2 cell switch command (e.g., an LTM cell switch command), the handover procedure may be relatively slow (as compared to procedures in which the UE 120 processes configurations upon reception), resulting in added delay between the reception of the L1/L2 cell switch command and a cell switching procedure. Moreover, such examples may be associated with relatively high overhead (as compared to procedures in which the UE 120 processes configurations upon reception) because the UE 120 may transmit acknowledgement messages both upon reception of the configuration and upon successful application of the configuration of a selected target cell. On the other hand, L1/L2 mobility procedures in which the UE 120 processes configurations upon reception may be relatively quick because no processing (e.g., decoding and/or validation) needs to be performed following reception of the cell switch command, and may be associated with reduced overhead because only a single acknowledgement message may be sent upon validation of the configurations. However, such examples may be associated with high resource consumption at the UE 120, because the UE 120 must expend power and computing resources to process all configurations upon reception.

Some techniques and apparatuses described herein enable improved L1/L2 mobility procedures (e.g., improved LTM procedures) associated with reduced overhead, latency, and/or power and computing resource consumption. In some aspects, a UE may receive a lower layer triggered mobility configuration associated with one or more candidate cells. The UE may identify a subset of the candidate cells for processing a lower layer triggered mobility configuration upon reception of the lower layer triggered mobility configurations, with any remaining configurations being stored and thus processed only if the corresponding cell is indicated in an L1/L2 cell switch command or similar message. In some aspects, the UE may identify the subset of the candidate cells based at least in part on an explicit indication received from the network (e.g., a network node). In some other aspects, the UE may identify the subset of the candidate cells based at least in part on the subset of candidate cells satisfying at least one criterion, such as a measurement associated with each of the subset of candidate cells satisfying a threshold. As a result, by initially processing a subset of the configurations, the L1/L2 mobility procedures described herein may be associated with reduced overhead and/or latency as compared to L1/L2 mobility procedures in which the UE delays processing of all configurations until after a candidate cell is indicated by a cell switch command. Moreover, by selectively processing a subset of the configurations, the L1/L2 mobility procedures described herein may be associated with reduced power and computing resource consumption as compared to L1/L2 mobility procedures in which the UE processes all candidate cell configurations upon reception of the configurations.

As indicated above, FIGS. 4A-4C are provided as examples. Other examples may differ from what is described with respect to FIGS. 4A-4C.

Figure 5:
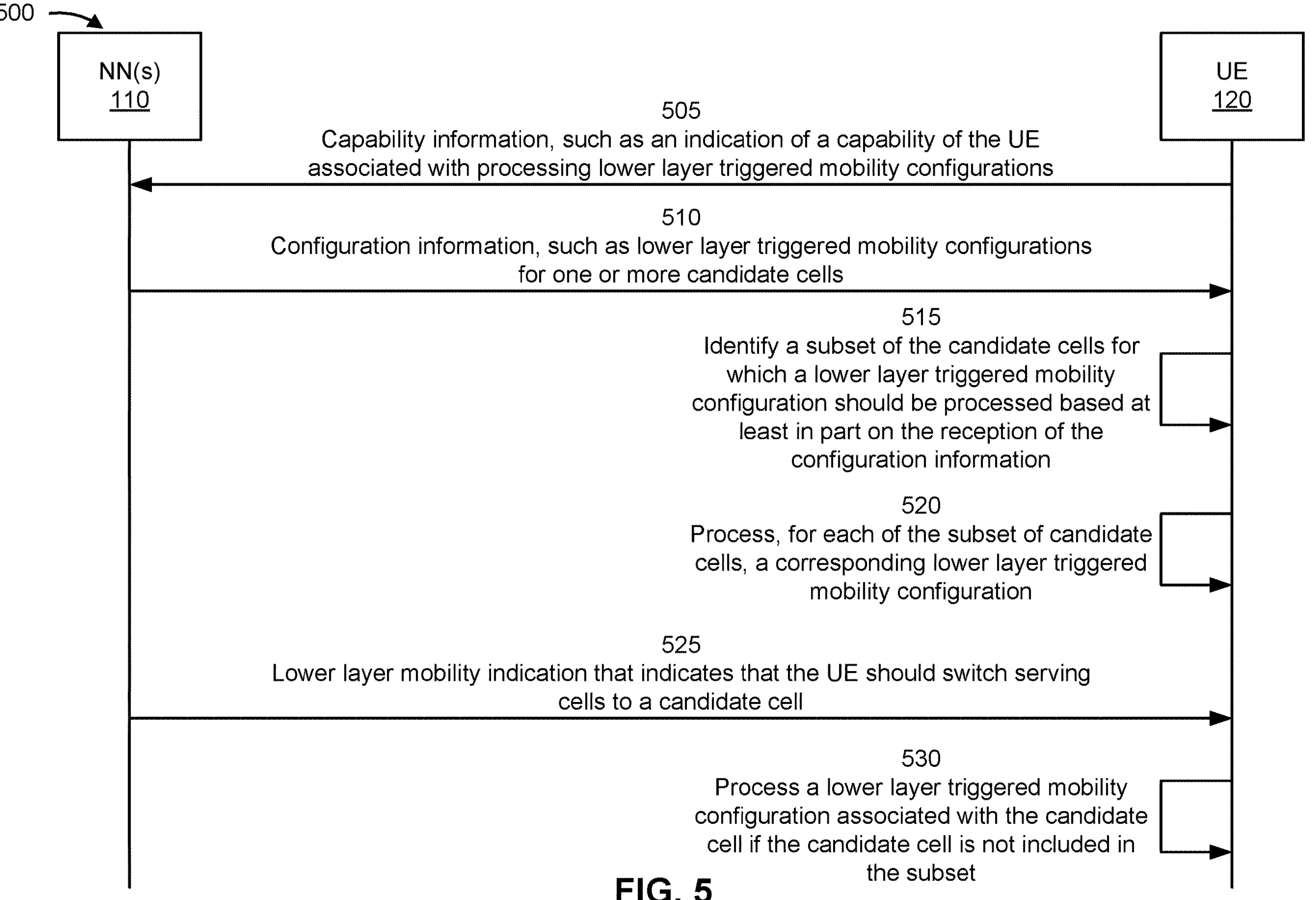
FIG. 5 is a diagram of an example associated with candidate cell configuration processing for lower layer triggered mobility, in accordance with the present disclosure.

FIG. 5 is a diagram of an example 500 associated with candidate cell configuration processing for lower layer triggered mobility, in accordance with the present disclosure. As shown in FIG. 5, a network node 110 (e.g., a CU, a DU, and/or an RU) may communicate with a UE 120. In some aspects, the network node 110 may correspond to one of the network nodes 110*a*, 110*b* described in connection with FIG. 4C, and/or the UE 120 may correspond to the UE 120 described in connection with FIG. 4C. In some aspects, the network node 110 and the UE 120 may be part of a wireless network (e.g., wireless network 100). The UE 120 and the network node 110 may have established a wireless connection prior to operations shown in FIG. 5. In some aspects, the network node 110 may be associated with a serving cell of the UE 120. Additionally, or alternatively, the network node 110 and/or the UE 120 may have a capability to perform an L1/L2 mobility procedure, such as the example 450 L1/L2 mobility procedure described above in connection with FIG. 4C.

As shown by reference number 505, the UE 120 may transmit, and the network node 110 may receive, capability information. In some aspects, the capability information may include an indication of a capability of the UE 120 associated with processing lower layer triggered mobility configurations. More particularly, the capability information may indicate whether the UE 120 is capable of performing a lower layer triggered mobility procedure (e.g., an L1/L2 mobility procedure), and, if so, a capability of the UE 120 to process (e.g., decode and/or validate) one or more lower layer triggered mobility configurations associated with the lower layer triggered mobility procedure. For example, and as will be described in more detail below in connection with reference number 520, in some aspects, the UE 120 may process (e.g., decode and/or validate) a subset of lower layer triggered mobility configurations upon reception of the one or more configurations. In such aspects, the capability information may indicate a quantity of lower layer triggered mobility configurations to be included in the subset (e.g., a quantity of lower layer triggered mobility configurations that the UE 120 is capable of processing upon reception of the configurations). In some aspects, the capability information may be based at least in part on a processing capability of the UE 120 (e.g., based at least in part on computing resources available at the UE 120).

Additionally, or alternatively, the capability information may indicate whether the UE 120 is capable of processing lower layer triggered mobility configurations upon reception of the configurations. In aspects in which the capability information indicates that the UE 120 is capable of processing lower layer triggered mobility configurations upon reception of the configurations, the capability information may additionally indicate the quantity of lower layer triggered mobility configurations to be included in the subset of candidate cells (e.g., a quantity of lower layer triggered mobility configurations that the UE 120 is capable of processing upon reception of the configurations), among other information, as described above. In aspects in which the capability information indicates that the UE 120 does not have a capability of processing lower layer triggered mobility configurations upon reception of the configurations, the capability information may be an implicit indication to the network node 110 that the subset of candidate cells is to be empty (e.g., the subset of candidate cells is to include no candidate cells). In such aspects, the UE 120 may instead decode a lower layer triggered mobility configuration upon receiving a cell switch command, or the like, which is described in more detail below.

As shown by reference number 510, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may include, for each of one or more candidate cells, a lower-layer triggered mobility configuration. For example, the configuration information may include configuration parameters for one or more cells near a current serving cell, such that, if a measurement associated with a neighboring cell exceeds a threshold or otherwise indicates that the neighboring cell is a good candidate to replace a current serving cell, the UE 120 may be triggered to perform a handover procedure based at least in part on the configuration parameters already stored at the UE 120, as described above in connection with example 450 of FIG. 4C. The configuration may indicate additional information associated with a lower layer triggered mobility procedure, such as an indication of one or more parameters associated with at least one criterion for evaluating candidate cells, which is described in more detail below in connection with reference number 515.

The UE 120 may configure itself based at least in part on the configuration information. In some aspects, the UE 120 may be configured to perform one or more operations described herein based at least in part on the configuration information.

As shown by reference number 515, the UE 120 may identify a subset of candidate cells, of the one or more candidate cells, for which a lower layer triggered mobility configuration is to be processed based at least in part on reception of the lower layer triggered mobility configuration. Put another way, rather than processing all of the lower layer triggered mobility configurations upon reception of the configurations, which may result in high power and computing resource consumption, or else processing only a lower layer triggered mobility configuration after receiving a cell switch command, which may result in high overhead and increased latency, the UE 120 may selectively choose a subset of the configurations for processing (e.g., for performing ASN.1 decoding and/or validation) upon receiving the RRC configurations. In some aspects, the subset of candidate cells may be empty (e.g., the subset of candidate cells may include no candidate cells). For example, in aspects in which the UE 120 is not configured to, and/or does not have a capability to, immediately decode and/or validate lower layer triggered mobility configurations upon reception of the lower layer triggered mobility configurations (e.g., for aspects in which the UE 120 may only decode a lower layer triggered mobility configuration upon receiving a cell switch command, or the like), the UE 120 may identify that the subset of candidate cells is empty and/or the UE 120 may identify that no lower layer triggered mobility configurations are to be processed upon reception of the configurations.

In some aspects, identifying the subset of candidate cells may be based at least in part on an indication received by the UE 120. More particularly, the network node 110 may transmit, and the UE 120 may receive, an indication of which candidate cells should be included in the subset (e.g., which lower layer triggered mobility configurations should initially be processed upon reception of the lower layer triggered mobility configurations). In some aspects, the indication may be received via at least one of an RRC communication, a MAC-CE communication, or a DCI communication. Additionally, or alternatively, the indication may be based at least in part on one or more measurements associated with the candidate cells and/or the capability information described above in connection with reference number 505, among other information. For example, the UE 120 may transmit a measurement report to the network node 110 that indicates certain measurements associated with neighboring cells, such as RSRP measurements, RSRQ measurements, RSSI measurements, SINR measurements, or similar measurements, and the network node 110 may select a number of neighboring cells associated with the highest measurements to be included in the subset.

Additionally, or alternatively, the network node 110 may select a number of neighboring cells based at least in part on the capability information. Put another way, identifying the subset of candidate cells may be based at least in part on a capability of the UE 120 associated with processing lower layer triggered mobility configurations. For example, in aspects in which the capability information indicates that the UE 120 has a capability to initially process n configurations upon reception of the one or more lower layer triggered mobility configurations, the network node 110 may select n configurations associated with the n best neighboring cells (e.g., as indicated by a measurement report) for the UE 120 to initially process.

In some other aspects, the UE 120 may identify the subset of candidate cells based at least in part on each of the subset of candidate cells satisfying at least one criterion. For example, the UE 120 may identify for inclusion in the subset of candidate cells any cell for which a channel quality measurement satisfies a threshold. For example, the UE 120 may identify for inclusion in the subset of candidate cells any cell for which an RSRP measurement, an RSRQ measurement, an RSSI measurement, and/or an SINR measurement satisfies a corresponding RSRP threshold, an RSRQ threshold, an RSSI threshold, and/or an SINR threshold. Additionally, or alternatively, the UE 120 may identify for inclusion in the subset of candidate cells any cell for which a quantity of channel quality measurements that satisfy a threshold over a period of time exceeds a specific number (sometimes referred to herein as N). For example, the UE 120 may be configured with a number of measurement occasions to perform measurements associated with neighboring cells, such as RSRP measurements, RSRQ measurements, RSSI measurements, and/or SINR measurements. If one or more measurements for a particular cell exceeds a threshold over a given period of time N or more times (e.g., if N or more measurement occasions include a measurement that exceeds a threshold over the given period of time), the UE 120 may identify the corresponding cell as a cell to be included in the subset of candidate cells. Similarly, the UE 120 may identify for inclusion in the subset of candidate cells any cell for which a quantity of beam measurements that satisfy a threshold exceeds a specific number (sometimes referred to herein as M). That is, if M or more beam measurements associated with beams of a candidate cell exceed a threshold, the UE 120 may identify the corresponding cell as a cell to be included in the subset of candidate cells.

Moreover, in aspects in which the UE 120 identifies the subset of candidate cells based at least in part on each of the subset of candidate cells satisfying at least one criterion, one or more parameters associated with the at least one criterion may be signaled and/or configured by the network node 110 (e.g., the network node 110 may transmit an indication of one or more parameters associated with at least one criterion to be used by the UE 120 to identify the subset of candidate cells). In some aspects, the indication of one or more parameters associated with the at least one criterion to be used by the UE 120 to identify the subset of candidate cells may be included with the configuration information described above in connection with reference number 505. In some other aspects, the indication of the one or more parameters associated with the at least one criterion to be used by the UE 120 to identify the subset of candidate cells may be indicated via a message different from a message used to convey the configuration information described above in connection with reference number 505, such as a separate RRC communication, a separate MAC-CE communication, a separate DCI communication, or a similar communication.

More particularly, in aspects in which the at least one criterion is associated with a channel quality measurement satisfying a threshold, the indication of one or more parameters may include an indication of the threshold. Additionally, or alternatively, in aspects in which the at least one criterion is associated with a quantity of channel quality measurements that satisfy a threshold over a period of time exceeding a specific number, the indication of one or more parameters may include an indication of the threshold, the period of time, and/or the specific number (e.g., N). In aspects in which the at least one criterion is associated with a quantity of beam measurements that satisfy a threshold exceeding a specific number, the indication of one or more parameters may include an indication of the threshold and/or the specific number (e.g., M).

As shown by reference number 520, the UE 120 may process, for each of the subset of candidate cells, a corresponding lower layer triggered mobility configuration. In some aspects, processing the lower layer triggered mobility configurations associated with the subset of candidate cells may include performing a decoding operation associated with the lower layer triggered mobility configurations (e.g., performing ASN.1 decoding) and/or performing a validation operation associated with the lower layer triggered mobility configurations. In this way, the UE 120 may initially process (e.g., process prior to receiving an L1/L2 cell switch command, or a similar indication from the network node 110) lower layer triggered mobility configurations associated with candidate cells most likely to become a future serving cell, while forgoing initial processing associated with candidate cells that are less likely to become a future serving cell.

As shown by reference number 525, the network node 110 may transmit, and the UE 120 may receive, a lower layer mobility indication (e.g., an L1/L2 mobility indication, an L1/L2 cell switch command, and/or an LTM cell switch command) indicating that the UE 120 should switch serving cells to a candidate cell, of the one or more candidate cells. In such aspects, if the candidate cell indicated by the switch command is a cell included in the subset of candidate cells (and thus a cell for which the UE 120 previously processed the corresponding lower layer triggered mobility configuration), the UE 120 may adopt a previously processed configuration based at least in part on the lower layer mobility indication. On the other hand, if the candidate cell indicated by the switch command is a cell not included in the subset of candidate cells (and thus a cell for which the UE 120 did not previously process the corresponding lower layer triggered mobility configuration), the UE 120 may first process the corresponding lower layer triggered mobility configuration prior to executing the cell switch command More particularly, in such aspects, and as indicated by reference number 530, the UE 120 may process a lower-layer triggered mobility configuration associated with the candidate cell upon reception of the lower layer mobility indication based at least in part on the candidate cell not being included in the subset of cells.

Based at least in part on the UE 120 selectively and/or conditionally decoding and/or validating one or more lower layer triggered mobility configurations, the UE 120 and/or the network node 110 may conserve computing, power, network, and/or communication resources that may have otherwise been consumed in association with traditional L1/L2 mobility procedures. For example, based at least in part on the UE 120 selectively and/or conditionally decoding and/or validating one or more lower layer triggered mobility configurations as described above in connection with reference numbers 505-530, the UE 120 and the network node 110 may communicate with reduced overhead and/or latency as compared to L1/L2 mobility procedures in which the UE 120 delays processing of all configurations until after a candidate cell is indicated by a cell switch command. Moreover, based at least in part on the UE 120 selectively and/or conditionally decoding and/or validating one or more lower layer triggered mobility configurations as described above in connection with reference numbers 505-530, the UE 120 and the network node 110 may conserve computing, power, network, and/or communication resources that may have otherwise been consumed by L1/L2 mobility procedures in which the UE 120 processes all candidate cell configurations upon reception of the configurations.

As indicated above, FIG. 5 is provided as an example. Other examples may differ from what is described with respect to FIG. 5.

FIG. 6 is a diagram illustrating an example process 600 performed, for example, by a UE, in accordance with the present disclosure. Example process 600 is an example where the UE (e.g., UE 120) performs operations associated with candidate cell configuration processing for lower layer triggered mobility.

As shown in FIG. 6, in some aspects, process 600 may include receiving, for each of one or more candidate cells, a lower layer triggered mobility configuration (block 610). For example, the UE (e.g., using communication manager 140 and/or reception component 802, depicted in FIG. 8) may receive, for each of one or more candidate cells, a lower layer triggered mobility configuration, as described above.

As further shown in FIG. 6, in some aspects, process 600 may include identifying a subset of candidate cells, of the one or more candidate cells, for which a lower layer triggered mobility configuration is to be processed based at least in part on reception of the lower layer triggered mobility configuration (block 620). For example, the UE (e.g., using communication manager 140 and/or identification component 808, depicted in FIG. 8) may identify a subset of candidate cells, of the one or more candidate cells, for which a lower layer triggered mobility configuration is to be processed based at least in part on reception of the lower layer triggered mobility configuration, as described above.

As further shown in FIG. 6, in some aspects, process 600 may include processing, for each of the subset of candidate cells, a corresponding lower layer triggered mobility configuration (block 630). For example, the UE (e.g., using communication manager 140 and/or processing component 810, depicted in FIG. 8) may process, for each of the subset of candidate cells, a corresponding lower layer triggered mobility configuration, as described above.

Process 600 may include additional aspects, such as any single aspect or any combination of aspects described below and/or in connection with one or more other processes described elsewhere herein.

In a first aspect, the processing the corresponding lower layer triggered mobility configuration includes performing at least one of a decoding operation associated with the corresponding lower layer triggered mobility configuration or a validation operation associated with the lower layer triggered mobility configuration.

In a second aspect, alone or in combination with the first aspect, process 600 includes receiving a lower layer mobility indication that indicates that the UE should switch serving cells to a candidate cell, of the one or more candidate cells.

In a third aspect, alone or in combination with one or more of the first and second aspects, process 600 includes processing a lower layer triggered mobility configuration associated with the candidate cell upon reception of the lower layer mobility indication based at least in part on the candidate cell not being included in the subset of cells.

In a fourth aspect, alone or in combination with one or more of the first through third aspects, the identifying the subset of candidate cells is based at least in part on an indication received by the UE.

In a fifth aspect, alone or in combination with one or more of the first through fourth aspects, the indication is received via at least one of an RRC communication, a MAC-CE communication, or a DCI communication.

In a sixth aspect, alone or in combination with one or more of the first through fifth aspects, the identifying the subset of candidate cells is based at least in part on each of the subset of candidate cells satisfying at least one criterion.

In a seventh aspect, alone or in combination with one or more of the first through sixth aspects, the at least one criterion is associated with a channel quality measurement satisfying a threshold.

In an eighth aspect, alone or in combination with one or more of the first through seventh aspects, the at least one criterion is associated with a quantity of channel quality measurements that satisfy a threshold over a period of time exceeding a specific number.

In a ninth aspect, alone or in combination with one or more of the first through eighth aspects, the at least one criterion is associated with a quantity of beam measurements that satisfy a threshold exceeding a specific number.

In a tenth aspect, alone or in combination with one or more of the first through ninth aspects, the identifying the subset of candidate cells is based at least in part on a capability of the UE associated with processing lower layer triggered mobility configurations.

In an eleventh aspect, alone or in combination with one or more of the first through tenth aspects, process 600 includes transmitting an indication of a capability of the UE associated with processing lower layer triggered mobility configurations.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a diagram illustrating an example process 700 performed, for example, by a network node, in accordance with the present disclosure. Example process 700 is an example where the network node (e.g., network node 110) performs operations associated with candidate cell configuration processing for lower layer triggered mobility.

As shown in FIG. 7, in some aspects, process 700 may include transmitting, for each of one or more candidate cells, a lower layer triggered mobility configuration (block 710). For example, the network node (e.g., using communication manager 150, transmission component 904, and/or configuration component 908, depicted in FIG. 9) may transmit, for each of one or more candidate cells, a lower layer triggered mobility configuration, as described above.

As further shown in FIG. 7, in some aspects, process 700 may include transmitting at least one of: an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells (block 720). For example, the network node (e.g., using communication manager 150, transmission component 904, and/or configuration component 908, depicted in FIG. 9) may transmit at least one of: an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells, as described above.

Process 700 may include additional aspects, such as any single aspect or any combination of aspects described below and/or in connection with one or more other processes described elsewhere herein.

In a first aspect, the processing of the lower layer triggered mobility configuration is associated with at least one of a decoding operation associated with the corresponding lower layer triggered mobility configuration or a validation operation associated with the lower layer triggered mobility configuration.

In a second aspect, alone or in combination with the first aspect, process 700 includes transmitting a lower layer mobility indication that indicates that the UE should switch serving cells to a candidate cell, of the one or more candidate cells.

In a third aspect, alone or in combination with one or more of the first and second aspects, process 700 includes transmitting the indication of the subset of candidate cells.

In a fourth aspect, alone or in combination with one or more of the first through third aspects, the indication is transmitted via at least one of an RRC communication, a MAC-CE communication, or a DCI communication.

In a fifth aspect, alone or in combination with one or more of the first through fourth aspects, process 700 includes transmitting the indication of the one or more parameters associated with the at least one criterion to be used by the UE to identify the subset of candidate cells.

In a sixth aspect, alone or in combination with one or more of the first through fifth aspects, the at least one criterion is associated with a channel quality measurement satisfying a threshold, and the one or more parameters include an indication of the threshold.

In a seventh aspect, alone or in combination with one or more of the first through sixth aspects, the at least one criterion is associated with a quantity of channel quality measurements that satisfy a threshold over a period of time exceeding a specific number, and the one or more parameters include an indication of at least one of the threshold, the period of time, or the specific number.

In an eighth aspect, alone or in combination with one or more of the first through seventh aspects, the at least one criterion is associated with a quantity of beam measurements that satisfy a threshold exceeding a specific number, and the one or more parameters include an indication of at least one of the threshold or the specific number.

In a ninth aspect, alone or in combination with one or more of the first through eighth aspects, the transmitting the at least one of the indication of the subset of candidate cells or the indication of the one or more parameters associated with the at least one criterion is based at least in part on a capability of the UE associated with processing lower layer triggered mobility configurations.

In a tenth aspect, alone or in combination with one or more of the first through ninth aspects, process 700 includes receiving an indication of a capability of the UE associated with processing lower layer triggered mobility configurations.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
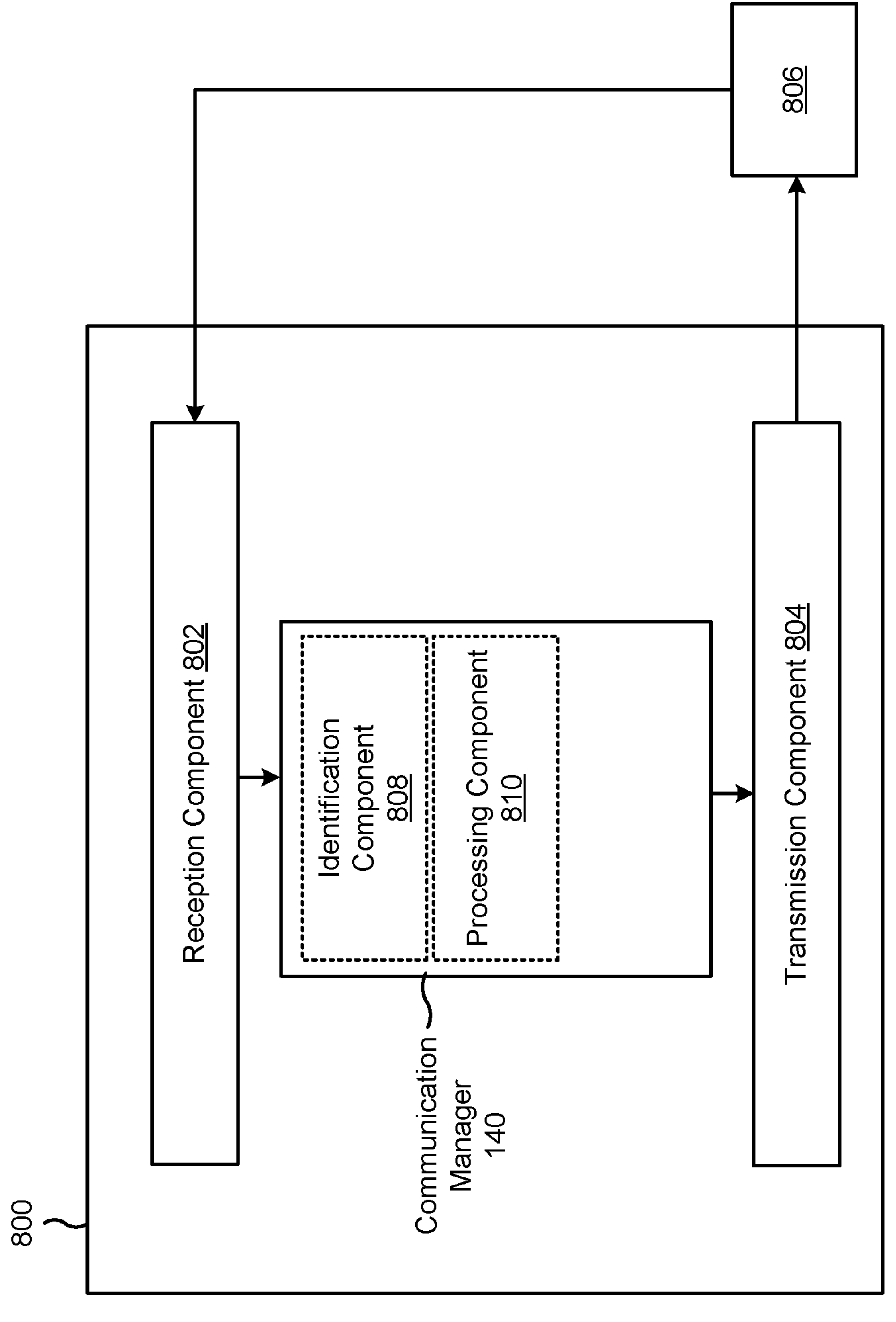
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE 120, or a UE 120 may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a network node, or another wireless communication device) using the reception component 802 and the transmission component 804. As further shown, the apparatus 800 may include the communication manager 140. The communication manager 140 may include one or more of an identification component 808 or a processing component 810, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the UE 120 described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE 120 described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE 120 described in connection with FIG. 2. In some aspects, the transmission component 804 may be co-located with the reception component 802 in a transceiver.

The reception component 802 may receive, for each of one or more candidate cells, a lower layer triggered mobility configuration. The identification component 808 may identify a subset of candidate cells, of the one or more candidate cells, for which a lower layer triggered mobility configuration is to be processed based at least in part on reception of the lower layer triggered mobility configuration. The processing component 810 may process, for each of the subset of candidate cells, a corresponding lower layer triggered mobility configuration.

The reception component 802 may receive a lower layer mobility indication that indicates that the UE should switch serving cells to a candidate cell, of the one or more candidate cells.

The processing component 810 may process a lower layer triggered mobility configuration associated with the candidate cell upon reception of the lower layer mobility indication based at least in part on the candidate cell not being included in the subset of cells.

The transmission component 804 may transmit an indication of a capability of the UE associated with processing lower layer triggered mobility configurations.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
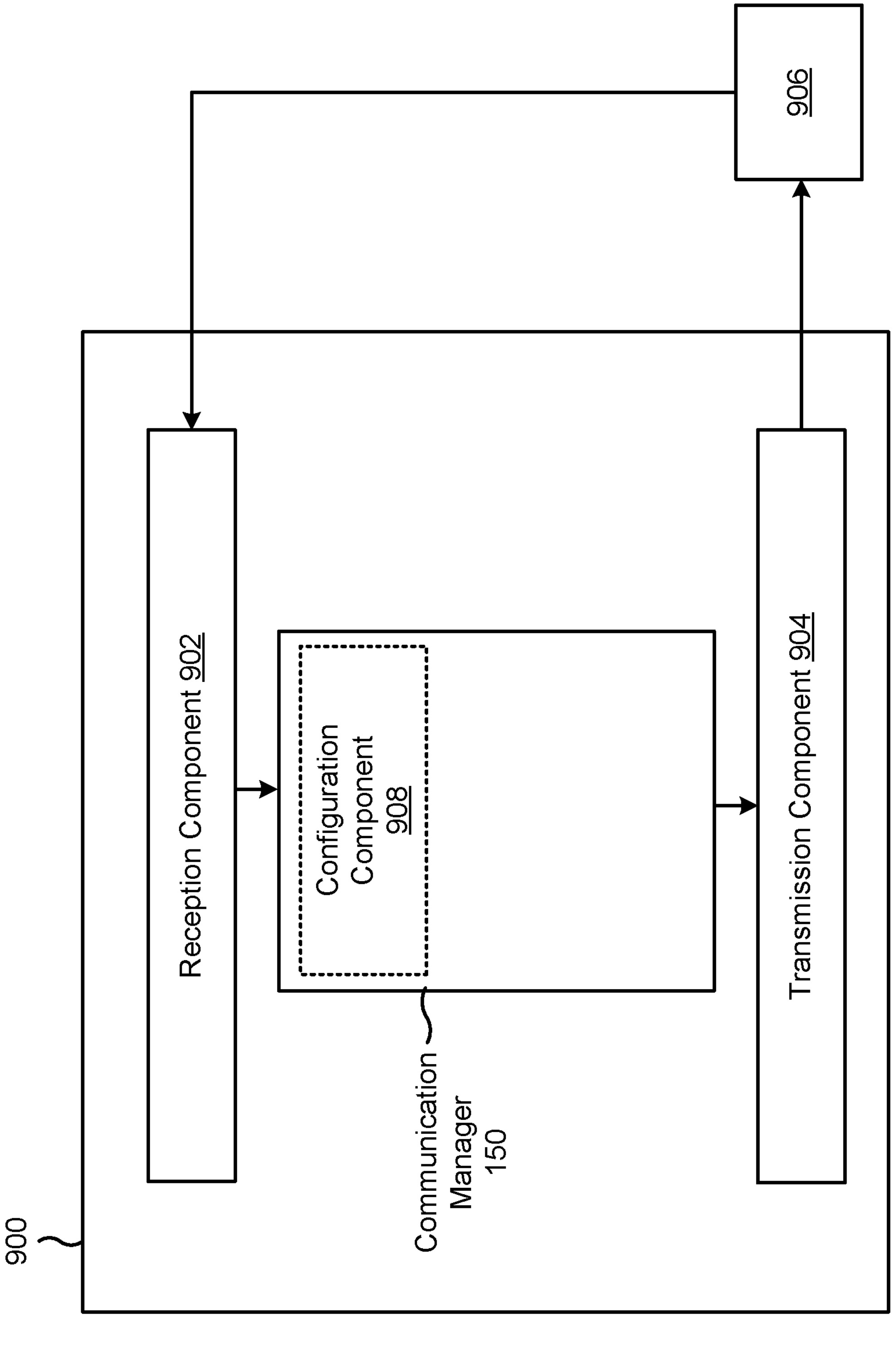
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a network node 110, or a network node 110 may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 150. The communication manager 150 may include a configuration component 908, among other examples.

In some aspects, the apparatus 900 may be configured to perform one or more operations described herein in connection with FIG. 5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the network node 110 described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network node 110 described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network node 110 described in connection with FIG. 2. In some aspects, the transmission component 904 may be co-located with the reception component 902 in a transceiver.

The transmission component 904 and/or the configuration component 908 may transmit, for each of one or more candidate cells, a lower layer triggered mobility configuration. The transmission component 904 may transmit at least one of an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

The transmission component 904 may transmit a lower layer mobility indication that indicates that the UE should switch serving cells to a candidate cell, of the one or more candidate cells.

The transmission component 904 and/or the configuration component 908 may transmit the indication of the subset of candidate cells.

The transmission component 904 and/or the configuration component 908 may transmit the indication of the one or more parameters associated with the at least one criterion to be used by the UE to identify the subset of candidate cells.

The reception component 902 may receive an indication of a capability of the UE associated with processing lower layer triggered mobility configurations.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a UE, comprising: receiving, for each of one or more candidate cells, a lower layer triggered mobility configuration; identifying a subset of candidate cells, of the one or more candidate cells, for which a lower layer triggered mobility configuration is to be processed based at least in part on reception of the lower layer triggered mobility configuration; and processing, for each of the subset of candidate cells, a corresponding lower layer triggered mobility configuration.

Aspect 2: The method of Aspect 1, wherein the processing the corresponding lower layer triggered mobility configuration includes performing at least one of a decoding operation associated with the corresponding lower layer triggered mobility configuration or a validation operation associated with the lower layer triggered mobility configuration.

Aspect 3: The method of any of Aspects 1-2, further comprising receiving a lower layer mobility indication that indicates that the UE should switch serving cells to a candidate cell, of the one or more candidate cells.

Aspect 4: The method of Aspect 3, further comprising processing a lower layer triggered mobility configuration associated with the candidate cell upon reception of the lower layer mobility indication based at least in part on the candidate cell not being included in the subset of cells.

Aspect 5: The method of any of Aspects 1-4, wherein the identifying the subset of candidate cells is based at least in part on an indication received by the UE.

Aspect 6: The method of Aspect 5, wherein the indication is received via at least one of a radio resource control communication, a MAC control element communication, or a downlink control information communication.

Aspect 7: The method of any of Aspects 1-6, wherein the identifying the subset of candidate cells is based at least in part on each of the subset of candidate cells satisfying at least one criterion.

Aspect 8: The method of Aspect 7, wherein the at least one criterion is associated with a channel quality measurement satisfying a threshold.

Aspect 9: The method of Aspect 7, wherein the at least one criterion is associated with a quantity of channel quality measurements that satisfy a threshold over a period of time exceeding a specific number.

Aspect 10: The method of Aspect 7, wherein the at least one criterion is associated with a quantity of beam measurements that satisfy a threshold exceeding a specific number.

Aspect 11: The method of any of Aspects 1-10, wherein the identifying the subset of candidate cells is based at least in part on a capability of the UE associated with processing lower layer triggered mobility configurations.

Aspect 12: The method of any of Aspects 1-11, further comprising transmitting an indication of a capability of the UE associated with processing lower layer triggered mobility configurations.

Aspect 13: The method of any of Aspects 1-12, wherein the subset of candidate cells includes no candidate cells, and wherein the method further comprises receiving a lower layer mobility indication that indicates that the UE should switch serving cells to at least one candidate cell, of the one or more candidate cells, and processing a lower layer triggered mobility configuration associated with the at least one candidate cell upon reception of the lower layer mobility indication based at least in part on the subset of candidate cells including no candidate cells.

Aspect 14: The method of any of Aspects 1-13, further comprising transmitting capability information indicating that the UE is capable of one of: processing lower layer triggered mobility configurations upon receipt of the lower layer triggered configurations, or processing the lower layer triggered mobility configurations upon receipt of a lower layer mobility indication that indicates that the UE should switch serving cells to at least one candidate cell, of the one or more candidate cells, wherein processing, for each of the subset of candidate cells, the corresponding lower layer triggered mobility configuration is based at least in part on the capability information.

Aspect 15: A method of wireless communication performed by a network node, comprising: transmitting, for each of one or more candidate cells, a lower layer triggered mobility configuration; and transmitting at least one of: an indication of a subset of candidate cells, of the one or more candidate cells, for which a UE should perform processing of a lower layer triggered mobility configuration based at least in part on reception of the lower layer triggered mobility configuration, or an indication of one or more parameters associated with at least one criterion to be used by the UE to identify the subset of candidate cells.

Aspect 16: The method of Aspect 15, wherein the processing of the lower layer triggered mobility configuration is associated with at least one of a decoding operation associated with the corresponding lower layer triggered mobility configuration or a validation operation associated with the lower layer triggered mobility configuration.

Aspect 17: The method of any of Aspects 15-16, further comprising transmitting a lower layer mobility indication that indicates that the UE should switch serving cells to a candidate cell, of the one or more candidate cells.

Aspect 18: The method of any of Aspects 15-17, further comprising transmitting the indication of the subset of candidate cells.

Aspect 19: The method of Aspect 18, wherein the indication is transmitted via at least one of a radio resource control communication, a MAC control element communication, or a downlink control information communication.

Aspect 20: The method of any of Aspects 15-19, further comprising transmitting the indication of the one or more parameters associated with the at least one criterion to be used by the UE to identify the subset of candidate cells.

Aspect 21: The method of Aspect 20, wherein the at least one criterion is associated with a channel quality measurement satisfying a threshold, and wherein the one or more parameters include an indication of the threshold.

Aspect 22: The method of Aspect 20, wherein the at least one criterion is associated with a quantity of channel quality measurements that satisfy a threshold over a period of time exceeding a specific number, and wherein the one or more parameters include an indication of at least one of the threshold, the period of time, or the specific number.

Aspect 23: The method of Aspect 20, wherein the at least one criterion is associated with a quantity of beam measurements that satisfy a threshold exceeding a specific number, and wherein the one or more parameters include an indication of at least one of the threshold or the specific number.

Aspect 24: The method of any of Aspects 15-23, wherein the transmitting the at least one of the indication of the subset of candidate cells or the indication of the one or more parameters associated with the at least one criterion is based at least in part on a capability of the UE associated with processing lower layer triggered mobility configurations.

Aspect 25: The method of any of Aspects 15-24, further comprising receiving an indication of a capability of the UE associated with processing lower layer triggered mobility configurations.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors coupled to the one or more memories, the one or more memories including instructions executable by the one or more processors to cause the UE to:

transmit an indication of a capability of the UE associated with processing lower layer triggered mobility configurations;

receive, for each of one or more candidate cells, a lower layer triggered mobility configuration;

identify a subset of candidate cells, of the one or more candidate cells, for which a lower layer triggered mobility configuration is to be processed based at least in part on reception of the lower layer triggered mobility configuration and the capability of the UE; and process, for each of the subset of candidate cells, a corresponding lower layer triggered mobility configuration.

2. The UE of claim 1, wherein the one or more memories include instructions executable by the one or more processors to cause the UE to, when processing the corresponding lower layer triggered mobility configuration, perform at least one of a decoding operation associated with the corresponding lower layer triggered mobility configuration or a validation operation associated with the lower layer triggered mobility configuration.

3. The UE of claim 1, wherein the one or more memories further include instructions executable by the one or more processors to cause the UE to receive a lower layer mobility indication that indicates that the UE should switch serving cells to a candidate cell, of the one or more candidate cells.

4. The UE of claim 3, wherein the one or more memories further include instructions executable by the one or more processors to cause the UE to process a lower layer triggered mobility configuration associated with the candidate cell upon reception of the lower layer mobility indication based at least in part on the candidate cell not being included in the subset of cells.

5. The UE of claim 1, wherein the one or more memories include instructions executable by the one or more processors to cause the UE to, when identifying the subset of candidate cells, identify the subset of candidate cells based at least in part on an indication received by the UE.

6. The UE of claim 5, wherein the one or more memories further include instructions executable by the one or more processors to cause the UE to receive the indication via at least one of a radio resource control communication, a medium access control (MAC) control element communication, or a downlink control information communication.

7. The UE of claim 1, wherein the one or more memories include instructions executable by the one or more processors to cause the UE to, when identifying the subset of candidate cells, identify the subset of candidate cells based at least in part on each of the subset of candidate cells satisfying at least one criterion.

8. The UE of claim 7, wherein the at least one criterion is associated with a channel quality measurement satisfying a threshold.

9. The UE of claim 7, wherein the at least one criterion is associated with a quantity of channel quality measurements that satisfy a threshold over a period of time exceeding a specific number.

10. The UE of claim 7, wherein the at least one criterion is associated with a quantity of beam measurements that satisfy a threshold exceeding a specific number.

11. The UE of claim 1, wherein the one or more memories include instructions executable by the one or more processors to cause the UE to, when identifying the subset of candidate cells, identify the subset of candidate cells based at least in part on a capability of the UE associated with processing lower layer triggered mobility configurations.

12. The UE of claim 1, wherein the subset of candidate cells includes no candidate cells, and wherein the one or more memories further include instructions executable by the one or more processors to cause the UE to:

receive a lower layer mobility indication that indicates that the UE should switch serving cells to at least one candidate cell, of the one or more candidate cells, and process a lower layer triggered mobility configuration associated with the at least one candidate cell upon reception of the lower layer mobility indication based at least in part on the subset of candidate cells including no candidate cells.

13. The UE of claim 1, wherein the one or more memories further include instructions executable by the one or more processors to cause the UE to:

transmit capability information indicating that the UE is capable of one of:

processing lower layer triggered mobility configurations upon receipt of the lower layer triggered mobility configurations, or processing the lower layer triggered mobility configurations upon receipt of a lower layer mobility indication that indicates that the UE should switch serving cells to at least one candidate cell, of the one or more candidate cells, and wherein processing, for each of the subset of candidate cells, the corresponding lower layer triggered mobility configuration is based at least in part on the capability information.

14. A network node for wireless communication, comprising:

one or more memories; and one or more processors coupled to the one or more memories, the one or more memories including instructions executable by the one or more processors to cause the network node to:

receive an indication of a capability of user equipment (UE) associated with processing lower layer triggered mobility configurations;

transmit, for each of one or more candidate cells, a lower layer triggered mobility configuration; and transmit, based at least in part on the capability of the UE associated with processing lower layer triggered mobility configurations, at least one of:

an indication of a subset of candidate cells, of the one or more candidate cells, for which the UE should perform processing of a lower layer triggered mobility configuration based at least in part on reception of the lower layer triggered mobility configuration, or an indication of one or more parameters associated with at least one criterion to be used by the UE to identify the subset of candidate cells.

15. The network node of claim 14, wherein processing of the lower layer triggered mobility configuration is associated with at least one of a decoding operation associated with the corresponding lower layer triggered mobility configuration or a validation operation associated with the lower layer triggered mobility configuration.

16. The network node of claim 14, wherein the one or more memories further include instructions executable by the one or more processors to cause the network node to transmit a lower layer mobility indication that indicates that the UE should switch serving cells to a candidate cell, of the one or more candidate cells.

17. The network node of claim 14, wherein the one or more memories further include instructions executable by the one or more processors to cause the network node to transmit the indication of the subset of candidate cells.

18. The network node of claim 17, wherein the one or more memories include instructions executable by the one or more processors to cause the network node to, when transmitting the indication of the subset of candidate cells, transmit the indication via at least one of a radio resource control communication, a medium access control (MAC) control element communication, or a downlink control information communication.

19. The network node of claim 14, wherein the one or more memories further include instructions executable by the one or more processors to cause the network node to transmit the indication of the one or more parameters associated with the at least one criterion to be used by the UE to identify the subset of candidate cells.

20. The network node of claim 19, wherein the at least one criterion is associated with a channel quality measurement satisfying a threshold, and wherein the one or more parameters include an indication of the threshold.

21. The network node of claim 19, wherein the at least one criterion is associated with a quantity of channel quality measurements that satisfy a threshold over a period of time exceeding a specific number, and wherein the one or more parameters include an indication of at least one of the threshold, the period of time, or the specific number.

22. The network node of claim 19, wherein the at least one criterion is associated with a quantity of beam measurements that satisfy a threshold exceeding a specific number, and wherein the one or more parameters include an indication of at least one of the threshold or the specific number.

23. A method of wireless communication performed by a user equipment (UE), comprising:

transmit an indication of a capability of the UE associated with processing lower layer triggered mobility configurations;

receiving, for each of one or more candidate cells, a lower layer triggered mobility configuration;

identifying a subset of candidate cells, of the one or more candidate cells, for which a lower layer triggered mobility configuration is to be processed based at least in part on reception of the lower layer triggered mobility configuration and the capability of the UE; and processing, for each of the subset of candidate cells, a corresponding lower layer triggered mobility configuration.

24. The method of claim 23, further comprising receiving a lower layer mobility indication that indicates that the UE should switch serving cells to a candidate cell, of the one or more candidate cells.

25. The method of claim 24, further comprising processing a lower layer triggered mobility configuration associated with the candidate cell upon reception of the lower layer mobility indication based at least in part on the candidate cell not being included in the subset of cells.

26. The method of claim 23, comprising, when processing the corresponding lower layer triggered mobility configuration, performing at least one of a decoding operation associated with the corresponding lower layer triggered mobility configuration or a validation operation associated with the lower layer triggered mobility configuration.

27. The method of claim 23, comprising, when identifying the subset of candidate cells, identifying the subset of candidate cells based at least in part on an indication received by the UE.

28. The method of claim 23, comprising, when identifying the subset of candidate cells, identifying the subset of candidate cells based at least in part on each of the subset of candidate cells satisfying at least one criterion.

29. A method of wireless communication performed by a network node, comprising:

receiving an indication of a capability of user equipment (UE) associated with processing lower layer triggered mobility configurations;

transmitting, for each of one or more candidate cells, a lower layer triggered mobility configuration; and transmitting at least one of:

an indication of a subset of candidate cells, of the one or more candidate cells, for which the UE should perform processing of a lower layer triggered mobility configuration based at least in part on reception of the lower layer triggered mobility configuration, the subset of candidate cells based at least in part on the capability of the UE, or an indication of one or more parameters associated with at least one criterion to be used by the UE to identify the subset of candidate cells.

30. The method of claim 29, further comprising transmitting a lower layer mobility indication that indicates that the UE should switch serving cells to a candidate cell, of the one or more candidate cells.

* * * * *